March 12, 1963 R. L. WEBER III 3,080,624
LIQUID VAPORIZER
Filed May 16, 1960 3 Sheets-Sheet 1

INVENTOR
ROBERT L. WEBER III
BY *H. B. Willson & Co.*
ATTORNEY

March 12, 1963  R. L. WEBER III  3,080,624
LIQUID VAPORIZER
Filed May 16, 1960  3 Sheets-Sheet 2
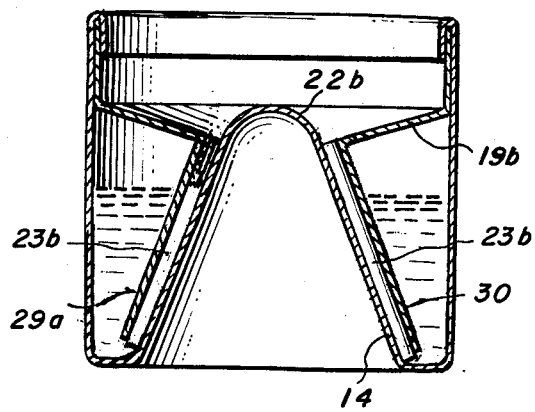
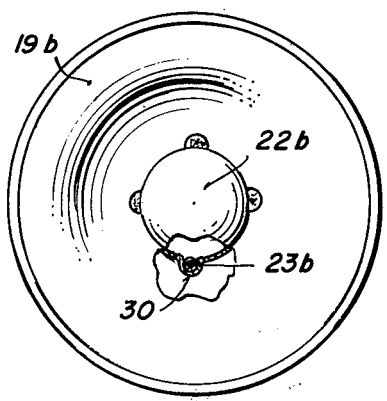
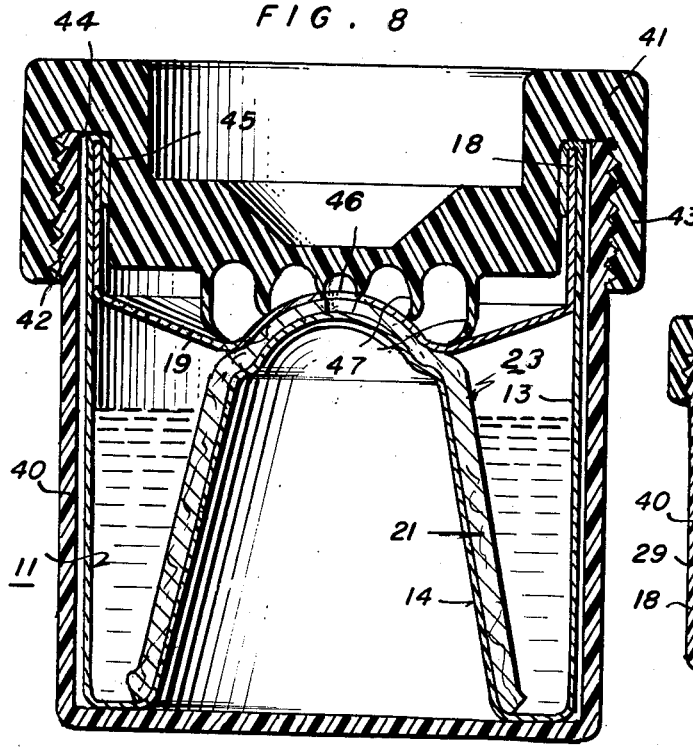
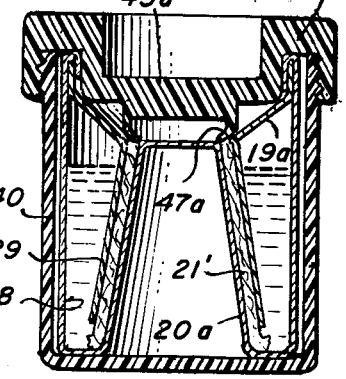
INVENTOR
ROBERT L. WEBER III
BY
ATTORNEY March 12, 1963  R. L. WEBER III  3,080,624
LIQUID VAPORIZER
Filed May 16, 1960  3 Sheets-Sheet 3

INVENTOR
ROBERT L. WEBER III
BY
*H. D. Willson & Co.*
ATTORNEY

United States Patent Office 3,080,624
Patented Mar. 12, 1963

3,080,624
LIQUID VAPORIZER
Robert L. Weber III, 19 Dudson Court,
Huntington, Conn.
Filed May 16, 1960, Ser. No. 29,283
8 Claims. (Cl. 21—120)

This invention relates to devices for vaporizing liquids by means of heat.

The invention contemplates a closed or virtually sealed cartridge adapted to be heated and containing the liquid to be vaporized and preferably some air, the top of the cartridge serving as a cup-like evaporating pan or tray together with capillary means between the liquid in the body of the cartridge and the top of the pan so that when the cartridge is heated, pressure will force the liquid up into the pan and when the cartridge cools vacuum will suck any liquid remaining in the pan down into the body of the cartridge. Such functioning of the vaporizing cartridge is especially advantageous when the liquid contains a highly volatile ingredient which would be lost if the liquid is exposed to the air for a period of time, and also when the heat is applied to the cartridge intermittently for predetermined periods of time either automatically or manually.

The invention further contemplates the use of such an automatically operating cartridge on an electrical resistance heating element which may be an incandescent electric light bulb, the current to which it may be supplied through a time-controlled switch.

While the invention has many uses such as dispensing therapeutic, antiseptic, germicidal, bactericidal, insecticidal and other vapors, it is particularly suitable for use as an electrical vaporizer such as are sold in the industrial, commercial and consumer markets for dispensing a pleasing fragrance, odor or smell either for the sake of the smell itself or to override unpleasant odors such as occur in toilet rooms, kitchen, etc.; or so that a particular odor is given off in proximity with the display and sale of some merchandise such as food products, perfumes, or toilet goods.

One object of the invention is to provide a simple, practical and effective device in which aromatics, medicinal oils, anti-bacterial liquids and the like may be used for dispensing the desired smells or vapors at spaced intervals of time, and without such loss of the highly volatile ingredients of such liquids as would occur if the liquids are exposed to the air during periods of non-use of the vaporizer.

Another object is to provide a vaporizer device in which a liquid containing highly volatile ingredients, will be stored against exposure to the air by being in a sealed container but upon application of heat to the latter, the liquid will be automatically fed out of the container to an open top evaporating pan and hence exposed to the air, and upon discontinuance of the application of heat and the cooling of the container, the unevaporated liquid in the pan will be automatically returned to the container.

Another object is to provide an automatically operating vaporizing device or cartridge of the above indicated character which may be made for use on the usual or standard 7 watt lamp bulb commonly used in night lights or on a lamp bulb of special shape for more efficient operation, both forms of the cartridge having a "hot-spot" where most of the evaporation or volatilization takes place.

Another object is to provide for such a liquid cartridge a shipping container or casing which will effectively prevent any of the liquid from escaping from the cartridge and also prevent any substantial loss of the volatile ingredients of the liquid during storage and transportation.

With the above and other objects and advantages in view, the invention resides in the novel combinations and arrangements of parts and the novel features of construction hereinafter described and claimed, and illustrated in the accompanying drawings which show the present preferred embodiments of the invention.

In the drawings:

FIGS. 6 and 7 are respectively sectional and top plan views of a modified form of cartridge in which capillary tubes are used instead of porous wicks;

FIG. 8 is a vertical sectional view through a shipping case or container for the cartridge and showing in section a cartridge similar to the one shown in FIG. 1 but adapted for use on a lamp bulb having a rounded or convex top;

FIG. 9 is a view similar to FIG. 8 and showing a shipping container on a cartridge similar to the one shown in FIG. 5 but designed for use on a lamp bulb having a flat top;

Figure 1:
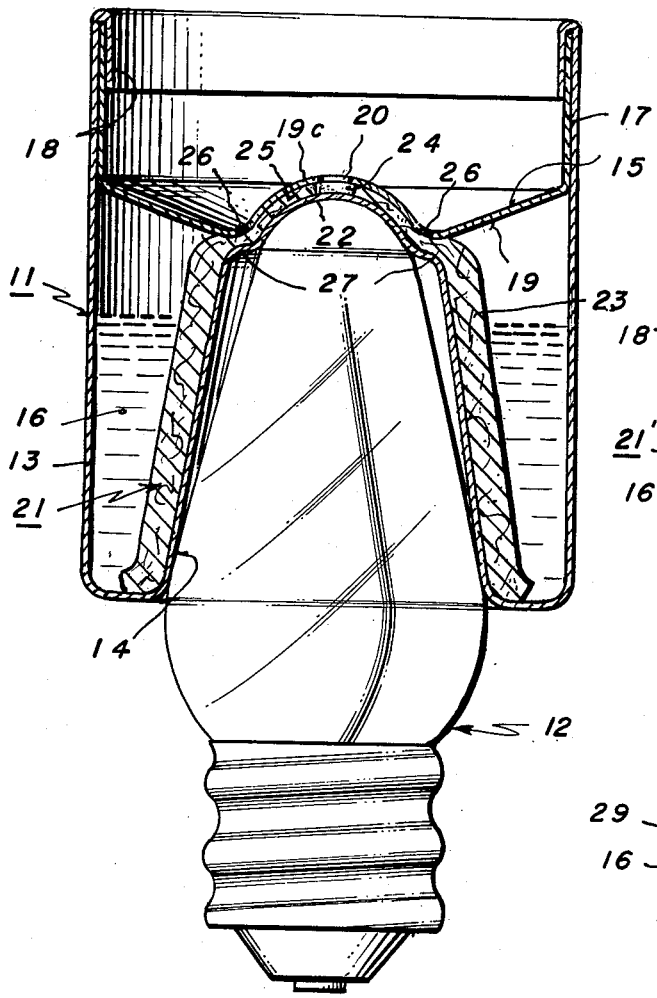
FIG. 1 is a vertical sectional view through one form of liquid vaporizing cartridge mounted on a standard 7 watt night light electric bulb, the parts being shown on an enlarged scale.

Referring more in detail to the drawings the numeral 11 denotes as a whole my liquid vaporizing cartridge, and 12 an electrical resistance heating element on which the cartridge is supported. One form of heating means may be a miniature 7 watt incandescent electric lamp bulb such as commonly used in night lights. It may be supported in an upright position in any suitable manner and supplied with an electric current by any desired means, but for the usual use a suitable timing mechanism is employed to automatically turn the electric current off after a predetermined period of time.

The cartridge 11 is an upright body made of metal or other suitable material and comprises a side wall 13, a bottom wall 14 and a top wall 15. The bottom 14 is in the form of an upwardly tapered dome of a size to receive the major portion of the lamp bulb 12 and is surrounded by the outer wall 13 which is preferably cylindrical. The walls 13 and 14 are integrally united at their lower ends as shown and the space between them forms a container for the liquid 16 which is to be vaporized.

The top 15 of the liquid container or cartridge is in the form of an open top pan or tray and it may also be formed of metal, plastic, glass or other suitable material. As shown in FIG. 1, the top or pan has an upstanding annular flange 17 which fits in the top of the cylindrical wall 13, the latter having its upper edge bent over the flange and clinched or otherwise fastened to provide an air tight seal or connection 18 between the body and the top. The flange surrounds a downwardly and inwardly extending annular part 19 to form an evaporating pan or tray and as its center is an opening 20. Capillary means, generally indicated at 21, between such an opening or the lowest part of the pan, and the liquid 16 in the cartridge, permit of movement of the liquid out of the cartridge and into the pan and the return of any unevaporated liquid in the pan back into the sealed cartridge during the heating and cooling respectively of the container or cartridge. Such capillary means may take the form of one or more fine tubes having capillary bores, or at least small metering orifices, as exemplified by the form shown in FIG. 6, but I preferably use a wick member of porous nature as exemplified by other forms such as shown in FIGS. 1, 4 and 5.

Figure 3:
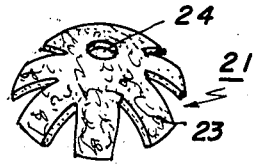
FIG. 3 is a detail perspective of the wick member.

I will first describe in detail the embodiment shown in FIG. 1 since it is substantially the same as cartridges I have tested and have found to operate as herein set forth. The upper end 22 of the dome-shaped bottom 14 has substantially the same curvature as the upper end of the ordinary lamp bulb shown in FIG. 11. That end 22 extends into a similarly shaped upwardly bulged portion 19c formed at the center of the annular portion 19 of the top 15. The opening 20 is at the center of the partly spherical bulge 19c and thus exposes the central portion of the top end 22 of the dome-shaped bottom 14. That provides a "hot-spot" where much of the evaporation of the liquid takes place as presently explained. The capillary member 21 is in the form of a porous wick 23, shown in FIG. 3, which may be made of felt or any other material that will give a capillary or wick action. The wick dips into the liquid and surrounds the wall 14. It may be made of a circular sheet of the porous material with a hole 24 at its center and with radial slits or cuts around its edge so that it may be preformed to fit over the dome 14 with the hole 24 disposed at the "hot-spot" 22. The portion of the wick around the hole is compressed as at 25 between the opposed curved portions 22 and 19c of the body and top of the cartridge. There is also formed in the top 15 an annular series of very small openings 26, these being at the lowest portion of the pan or tray; that is, where the portions 19 and 19c join. These fine openings 26 are covered by compressed portions of the wick. If desired the dome may be formed with an annular shouldered portion 27 opposite the holes 26. When sufficient heat is applied to the cartridge by the lamp, the liquid 16 will move up the wick and through its compressed portion 25, and enter the pan at the openings 20 and 26 where it will volatilize and evaporate to give off odors or vapors. When the heat is turned off and the cartridge cools, any liquid remaining in the pan will move down through the wick and into the body of the cartridge. It is believed that the upward movement of the liquid is caused by pressure created in the sealed cartridge by the expansion of the air and liquid and the vapor rising from the liquid when the cartridge is heated; and that the downward movement of the liquid is caused by suction created in the cartridge when it cools. The compressed portion of the wick not only prevents any free flow of the liquid out of the cartridge should the latter be inverted, but it also acts as a semi-seal which slows down the upward movement of the liquid during the time of application of heat. It has been found that as the liquid in the pan evaporates more liquid is supplied during the continued heating of the cartridge. The tested cartridge had a diameter of 1⅛" and about the same height, with a dome-shaped bottom that received the upper three quarters of the lamp bulb as indicated in FIG. 1. It is believed that since the liquid in the pan covers the compressed portions of the wick exposed at the openings 20 and 26, the weight of the liquid in the pan causes a certain amount of back pressure against which the liquid in the cartridge pushes during the heating period. As the liquid in the pan evaporates it is replaced by more liquid because of pressure and capillary action, so that when once equilibrium is established, the liquid will be evaporated at a substantially constant or fixed rate. When the heat is turned off and the cartridge cools, it is believed that due to the semi-sealing action of the compressed portion of the wick, the suction created in the cartridge first draws the unevaporated liquid in the pan down into the cartridge and then draws sufficient air into the cartridge to equalize the pressure within and without the latter when it has cooled. Since the lower portion of the wick dips into the liquid in the cartridge, the wick will remain saturated so long as there is liquid in the cartridge; and hence it is believed that the wick acts as a pipeline for the liquid and, when pressure is created in the cartridge, there is a saturation unbalance which causes the upward flow. Only very small amounts or areas of the compressed wick are exposed at the opening 20 and/or the openings 26, and hence very little volatization and evaporation of the liquid takes place from the wick itself. Consequently there is hardly any until the cartridge is heated, and as above noted the heat is supplied to both vaporize the liquid and create pressure to cause a continuous flow of the liquid. Most of the vaporization takes place at the surface of the liquid in the pan, and it is believed that that liquid acts as a pressure sensitive valve which allows a proper amount of liquid in the pan according to the temperature, that is, the amount of heat supplied. Thus it is believed that the "liquid valve" formed by the liquid covering the delivery holes 20 and 26, insures at all times that pressure and vacuum work in proper sequence.

Figure 4:
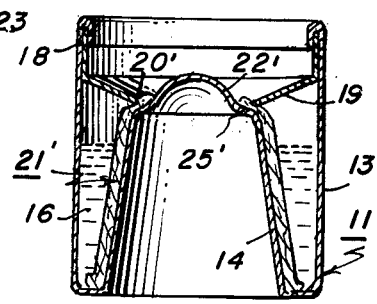
FIGS. 4 and 5 are reduced sectional views through two modified forms of cartridges in which wicks are used.

In the form shown in FIG. 4 the part 19c is omitted and the opening 20' is formed by the edge of the inclined portion 19' which edge compresses the annular wick 21' against the annular shoulder 27 as at 25'. In other respects the construction and operation is the same as above described. In this form there is a larger evaporating area or "hot-spot" 22'; and while the latter is shown as convex, it is obvious that it may be flat or substantially flat if a special shape bulb is used that has a flat upper end, as shown in FIG. 9. In such form the dome-shaped bottom of the cartridge may be shaped to fit the specially shaped bulb and thus obtain a better exchange of heat between the lamp and the cartridge.

Figure 5:
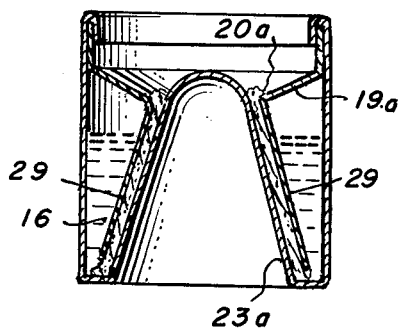
Figure 2:
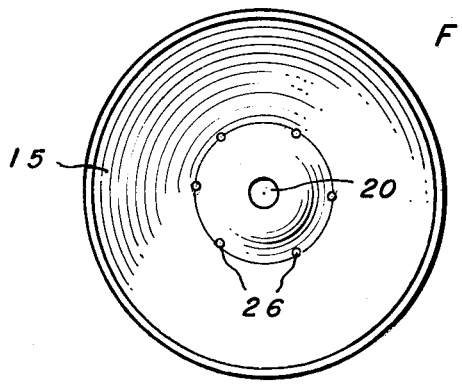
FIG. 2 is a top plan view of the cartridge on a reduced scale.
Figure 10:
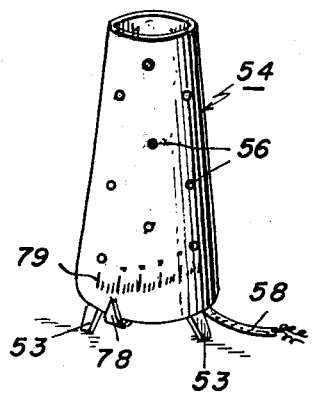
FIG. 10 is a small perspective view of an electric vaporizer unit or device in which one of my cartridges may be used and controlled by a timing mechanism.

The form shown in FIG. 5 is very similar to that of FIG. 4 and has the same operating characteristics. It differs from it in that a substantially cone-shaped skirt or flange 29 depends from inclined portion 19a at the opening 20a. This flange 29 has a length substantially the length or height of the wick 23a and it compresses the wick against the outer face of the dome-shaped bottom of the cartridge. By making the cone-shaped flange or extension integral with the part 19a, the major portion of the wick is compressed. This form has the advantage of preventing drip from the exposed edge of the wick when the cartridge is inverted since at that time the liquid in the cartridge would not be contacting the wick.

In the form shown in FIGS. 6 and 7 one or more capillary tubes are used instead of a porous wick. This form is similar to that of FIG. 5 in that a cone-shaped flange 29a depends from the inclined portion 19b and is shaped to contact with the outer face of the dome-shaped portion of the bottom except at points where one or more capillary tubes 23b are disposed in channels 30 formed in the flange 29a. As shown four of the tubes with capillary bores are equally spaced around the flange, the tubes having their open lower ends disposed close to the bottom of the liquid chamber and their open upper ends disposed around the "hot-spot" 22b. It will be understood that there is a sealed connection between the flange 29a and the dome or bottom 14 so that the only communication between the pan and the interior of the cartridge is through the capillary bores of the tubes. In this form also there can be no drip or spilling of the liquid from the cartridge when it is inverted.

In all of the embodiments of the cartridge the pan or tray, formed by the depressed portion of the top 15, preferably has a depth sufficient to hold substantially all of the liquid in the body so that there will be no overflow from the pan if too much heat is used by mistake. However, as above noted, if the right amount of heat is supplied to cause the proper flow of liquid to the pan, the latter may be quite shallow.

Since it is desirable that, during storage and transportation of the cartridges, there be no spilling or loss of liquid from the cartridge and no substantial loss of the volatile ingredients of the liquid, I have shown in FIGS. 8 and 9 two forms of shipping cases or containers for the cartridges. In FIG. 8 the form of cartridge illustrated in FIG. 1, is shown in a container having a body 40 and a removable top or cap 41. The cylindrical body 40 may be made of any stiff material such as metal or plastic and has external screw threads 42 at its open top for engagement by an internally screw threaded flange 43 on the cap. The internal diameter of the body is slightly greater than the external diameter of the cartridge and the depth of the body is slightly less than the height of the cartridge so that when the cap is screwed on the body, the cartridge will be clamped between the bottom of the body and an internal portion or shoulder 44 in the cap. The cap 41 is molded from a semi-soft and somewhat resilient plastic such as polyethylene. Formed on the inner face of the cap is a downwardly projecting cylindrical cartridge gripping and holding member 45 which is adapted to enter and frictionally grip the bent over flange 18 at the top of the cartridge so that when the cap is removed from the body 40, the cartridge will also be removed from the container. Formed on the bottom of the stopper-like boss or hub 45 are one or more flexible sealing fingers adapted to seal off the openings or delivery holes at which the wick is exposed or to seal off the upper ends of the capillary tubes. These sealing fingers may be variously disposed and shaped according to the construction of the cartridge. They are of circular or annular formation and of such size and length that they will seal the exposed portion or portions of the wick or the tubes. As shown in FIG. 8 there is an inner annular lip 46 adapted to partially enter the opening 20 when the cap is in its closed position, and also two outer concentric lips 47 to engage the top 13 of the cartridge on opposite sides of the annular series of holes 26.

The shipping container shown in FIG. 9 is the same in construction and operation as the one shown in FIG. 8 but it is adapted to the form of cartridge such as shown in FIGS. 4, 5 and 6, although the cartridge shown in FIG. 9 is adapted for use on a lamp bulb having a flat top. In FIG. 9 the cap 41$^a$ on the body 40 has on its stopper-like member 45$^a$ a single annular sealing lip 47$^a$ adapted to be forced against the lowest portion of the evaporating tray and thus seal the exposed upper edge of the wick.

It will be noted that these shipping containers provide double seals for the cartridges because when the cap is screwed down tight on the body, the flexible and resilient lips will seal around the liquid delivery opening in the top 15 and the frictional engagement of the elastic stopper member 45 with the inner edge of the top of the evaporating pan will prevent the escape of any liquid or vapors that may get by the sealing lips.

In FIGS. 10–13 I have shown one form of electric vaporizer unit in which the supply of electric current to the lamp bulb or other resistance heater may be controlled through a time controlled switch. It is to be understood that the cartridges and the vaporizing devices in which they are to be used will be made in different sizes and different smell or vapor discharging capacities. They may be made for use in homes, professional offices, industrial plants, commercial establishments, etc. The amount of pressure created in the cartridge will depend upon the wattage of the heater and lamp bulbs of 7, 10, 15 or even 20 watts may be used depending upon the amount of smell capacity or vapor discharging capacity desired. Since the cartridges are to be heated from time to time, it is necessary to use a timing mechanism that will automatically turn off the current after it has been set to flow for a predetermined time period such as from five to sixty minutes. If the current was kept on for too long a period too much smell or vapor would be produced for the room or space that is to be treated, and if too much heat is supplied to the cartridge the liquid in it would be damaged by "burning." The cartridge and the device in which it is heated must therefore be designed according to its intended use.

Figure 11:
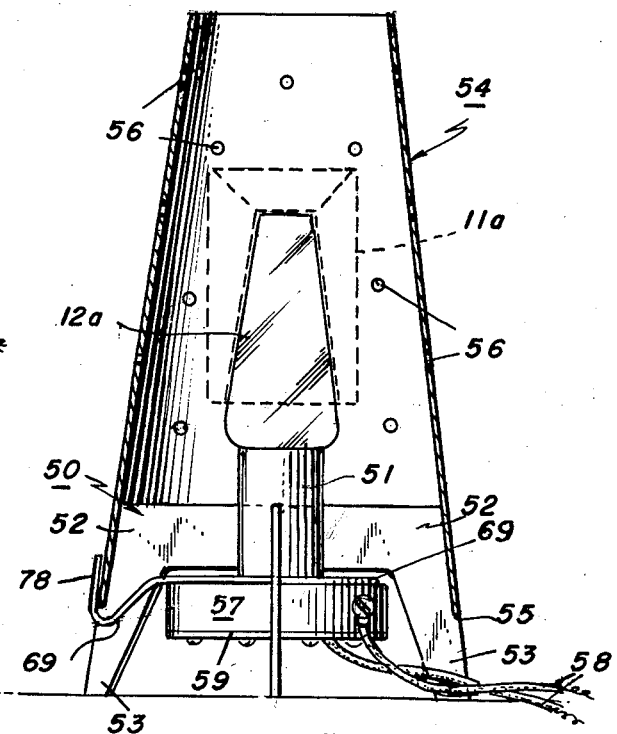
FIG. 11 is a vertical sectional view through the device shown in FIG. 10.

As shown in FIG. 11, the device comprises a body 50 preferably molded of a hard plastic material and including an electric lamp socket 51 from which four supporting fins 52 radiate and terminate in depending supporting legs 53. The outer edges of the legs are inclined inwardly and upwardly to receive a removable frustro-conical shaped hood 54, which is supported on shoulders 55 near the lower end of the legs. The hood surrounds the lamp bulb 12$^a$ and the cartridge 11$^a$, the latter being shown in dotted lines and may be of any of the constructions above described. The upper portion of the hood may be formed with small holes 56 so that a glance at the exterior of the device will show whether or not the heater is operating.

Figure 12:
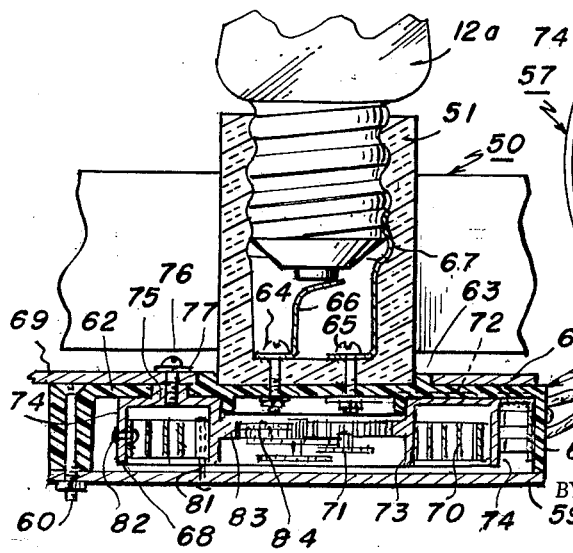
FIG. 12 is a detail sectional view on an enlarged scale showing one form of timing mechanism that may be used in the device.

Removably fixed to the bottom of the cylindrical lamp socket is the case or housing 57 of a time controlled switch mechanism to which the usual electric current is supplied by conductors 58. The switch and timer case 57 is molded of a plastic insulating material such as phenolic resin and is in the form of a flat cylindrical housing with an open bottom closed by a removable bottom plate or cover 59 which may be fastened by two or more screws or bolts 60. The latter, as will be understood on reference to FIG. 12, are in an annular side wall 61 which depends from a circular plate 62, these parts forming the body of the case 57. Formed on the top of the plate 62 is an annular upstanding rib or hub 63 of a size to receive the flat lower end of the socket 51 to which the case 57 is removably fixed by two brass bolts 64 and 65. The bolts fasten in the socket 51 center spring contact 66 and the outer screw shell contact 67 for the lamp, as shown in FIG. 12.

Mounted for limited rotation within the case 57 is a drum 68 of plastic insulating material that is manually moved in one direction by a control lever 69 to wind up the spring 70 of the timer mechanism and is moved in the opposite direction by the spring under the control of a suitable clock works 71 which includes the usual escapement means to slow down the rotation of the drum. The drum 68 is ring-shape and of inverted U-shape in cross section, having an annular top plate 72 and depending concentric inner and outer side walls 73 and 74. The drum rotates on an annular depending rib or hub formed on the bottom of the plate 62 concentric with the axis of the lamp socket and is engaged with the inner face of the cylindrical inner wall 73. The drum is supported for rotation in the case 57 by a plurality of upwardly projecting studs 75 formed on the top of its plate 72 and projecting through arcuate slots in the plate 62, one of the studs being shown in FIG. 12. The control lever 69 is fastened on these studs and swing about the hub 63 which projects into a circular opening in the enlarged flat inner end of the lever. The latter is disposed on the top of the case and is fixed to the studs by screws 76 and spring washers 77. The reduced radially projecting end of the lever 69 is bent to extend under the lower edge of the hood 54, as seen in FIG. 11, and terminates in an upwardly projecting fingerpiece and pointer 78 that coacts with suitable scale graduations 79 on the hood. The lever swings through an arc of about 20° in winding up the spring 70, and the ends of the slots in which the studs 75 move may be used as stops to limit the movement of the lever in each direction.

The spring 70 is a spiral coil of flat resilient metal and is disposed in the drum, one of its ends being held stationary on a pin 81 carried by the cover plate 59 and its other end being fixed at 82 to the outer wall 74 of the drum. Molded on the inner wall 73 of the drum is an internal gear 83, the teeth of which mesh with a gear wheel 84 that forms a part of the clock works and has a one-way ratchet mounting so that it may turn free when the drum is rotated to wind up the spring 70. Since any suitable form of spring motor or clock works may be used, those parts are rather diagrammatically shown in FIG. 12 for the sake of clearness.

Figure 13:
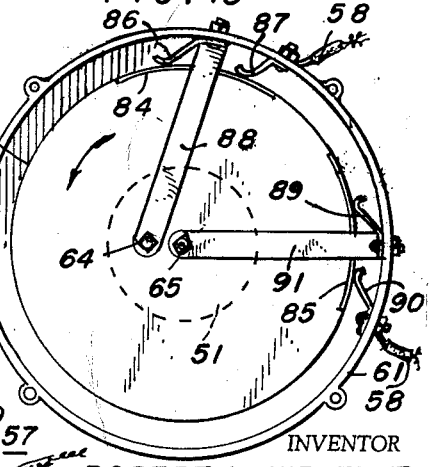
FIG. 13 is a diagrammatic view showing the arrangement of the contact strips and contact brushes on the rotary drum and the casing of the timing mechanism.

One form of switch mechanism for conducting the current to and from the lamp socket bolts 64 and 65 is shown in FIG. 13. On the outer face of the drum wall 74 are fastened two circumferentially spaced contact strips 84 and 85 with which coact spring brushes mounted on the inner face of the side wall 61 of the case 57. Coacting with the strip 84 are two brushes 86 and 87. The brush 86 is connected by a conductor strip 88 to the bolt 64 and the brush 87 is electrically connected to one side of the supply line 58. Coacting with the strip 85 are two brushes 89 and 90. The brush 89 is connected by a conductor strip 91 to the bolt 65 and the other brush 90 is electrically connected to the other side of the line 58. When the switch or control lever 69 is in its "off" position, the brushes 87 and 90 will not engage the strips 84 and 85 and no current can flow to the lamp. The circuit through the lamp will be completed when the drum is rotated by the lever and the extent to which the drum is turned will determine the length of time that current will flow to the lamp.

While in the devices tested, the top of the dome-shaped bottom of the carriage was rounded to substantially fit the rounded top of a night light bulb, as indicated in FIG. 1, I believe better and faster evaporation of the liquid in the pan will be obtained if the "hot-spot" is made flat as shown in FIGS. 9 and 11, because the liquid would spread out evenly over a flat surface and there would be more area of evaporation. It is therefore understood that in any way of the forms of the invention, the top of the dome may be flat so as to contact with a flat top on the bulb to obtain a faster and more even evaporation at the "hot-spot."

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. A cartridge-like liquid vaporizer to telescope over the bulb of an upright electric lamp or like heating element, comprising in combination, a closed upright container holding some air and a liquid to be vaporized, said container having a surrounding side wall, a bottom wall provided with an upwardly projecting dome-shaped portion positioned within said side wall so as to be surrounded by the liquid, said dome-shaped portion being hollow to receive the bulb in its lower end, and a top wall provided with a depressed portion to form an open-top evaporating pan; and capillary means between the liquid in the container and a low portion of the pan, permitting movement of the liquid between the interior of the container and the open-top pan, the container being otherwise sealed, whereby, when the container is heated, pressure created within the container will force liquid up into the pan and, when the container cools, suction within the container will draw liquid in the pan back into the container.

2. The vaporizer of claim 1 in which said capillary means is a wick of porous material supported between a part of said dome-shaped portion of the bottom wall and a part of the depressed portion of the top wall, the lower part of said wick dipping into the liquid and the upper part of the said wick having at least a portion of it exposed at a low portion of the pan, an intermediate portion of said wick between said portions of the top and bottom walls being sufficiently compressed to retard the movement of liquid through the wick, thereby creating pressure in the container when it is heated and vacuum when it cools.

3. The vaporizer of claim 1 in combination with an electric lamp bulb supported in the upright position and having an upper part disposed in said dome-shaped portion to serve as a heating element and as the sole support for the vaporizer, means for supplying an electric current to said bulb, and a manually-set, time-controlled switch means included in said current supply means.

4. The vaporizer of claim 1 in which the depressed portion of said top wall has at least one opening at a low portion of the pan, and said capillary means is a wick of porous material supported intermediate its top and bottom between said dome-shaped portion of the bottom wall and a part of said depressed portion of the top wall, the lower portion of said wick substantially surrounding said dome-shaped portion and an upper portion of said wick being exposed at said opening, a part of said wick adjacent its said exposed upper portion being compressed between said portions of the top and bottom walls, the compression being sufficient to so retard movement of liquid through the wick, as to create pressure in the container when it is heated and vacuum when it cools.

5. The vaporizer of claim 4 in which the top of said dome-shaped portion of the top wall has an upwardly directed convex portion surrounded by an annular shoulder, said convex portion being adapted to engage the convex top of an electric lamp bulb to support the container thereon, and in which said depressed portion of the top wall has a central upwardly extending convex portion of the same curvature as the convex part of said dome-shaped portion, the said opening in the depressed portion of the top wall being at the center of said convex portion, an annular series of holes in said depressed portion disposed opposite said annular shoulder, the compressed portion of the wick being between said two convex portions and opposite said annular series of holes, said wick having a central opening in line with the first said opening to expose parts of said convex portion of the top wall to any liquid in the pan.

6. The vaporizer of claim 4 in combination with a shipping case for the container comprising a tubular open-top body to receive the container, a removable cover for the body to retain the container therein, and at least one resilient sealing lip carried by the underside of said cover and adapted to be flexed into engagement with the depressed portion of the top wall of the container when the cover is applied to the body of the case to seal the said opening.

7. The vaporizer of claim 4 in which said wick has a central opening at said opening in the depressed portion of the top wall, and at said openings the central part of the top of said dome-shaped portion of the bottom wall is exposed to any liquid in the pan.

8. The vaporizer of claim 7 in which said central part of the top of the dome-shaped portion is flat to engage the flat top of a lamp bulb, whereby the bulb will be the sole support of the cartridge-like container and the transfer of the heat of the lamp will be facilitated.

References Cited in the file of this patent
UNITED STATES PATENTS
2,469,656  Lienert ------------------ May 10, 1949